United States Patent [19]

Sullivan et al.

[11] Patent Number: 4,673,521
[45] Date of Patent: Jun. 16, 1987

[54] PROCESS FOR REGENERATING SOLDER STRIPPING SOLUTIONS

[75] Inventors: Thomas E. Sullivan, Hamden; Mark A. Kulak, Milford, both of Conn.

[73] Assignee: Enthone, Incorporated, West Haven, Conn.

[21] Appl. No.: 820,038

[22] Filed: Jan. 21, 1986

[51] Int. Cl.$^4$ ............................................. C09K 13/08
[52] U.S. Cl. ...................................... 252/79.3; 75/77; 75/78; 156/642
[58] Field of Search ..................... 156/642; 252/79.32; 75/77, 78

[56] References Cited

U.S. PATENT DOCUMENTS

| | | | |
|---|---|---|---|
| 2,494,910 | 1/1950 | Spruance | 156/642 X |
| 2,614,913 | 10/1952 | Reindl et al. | 252/79.3 |
| 2,827,367 | 3/1958 | Cox | 252/79.3 X |
| 2,828,193 | 3/1958 | Newman | 156/642 |
| 3,926,699 | 12/1975 | Dixon | 156/656 |

Primary Examiner—Robert Lindsay
Attorney, Agent, or Firm—John J. Tomaszewski; Kenneth A. Koch

[57] ABSTRACT

A method for the regeneration of a spent aqueous ammonium bifluoride-hydrogen peroxide solder stripping solution containing contaminant tin ions comprising adding potassium ions to the solution to precipitate a filterable tin-potassium compound.

7 Claims, No Drawings

PROCESS FOR REGENERATING SOLDER STRIPPING SOLUTIONS

BACKGROUND OF THE INVENTION

This invention relates to the regeneration of solder stripping solutions and, more particularly, to the regeneration of ammonium bifluoride-hydrogen peroxide solutions used to strip solder from copper plated printed circuit boards.

Printed circuit boards are well-known and are used extensively in electrical equipment. Basically, a flat sheet of dielectric material such as epoxy, polyester, or other resin, contains the desired circuit design imprinted on its surface in the form of copper conductor circuits. Some circuit boards contain contact tabs or fingers to which connections between the circuit and other circuits or circuit boards are made.

Solders, which are essentially tin-lead binary alloys, are used for a number of purposes in printed circuit board manufacture. The tin-lead binary alloy may contain, by weight, about 1–99% tin, balance lead and a typical alloy contains about 60% tin–40% lead. Incidental impurities, as well as other alloying elements, may also be present in the solder. Basically, the solder is used as a protective covering (solder mask) for the bare copper circuit (SMOBC) type boards and for boards containing contact tabs and the solder must be stripped from the boards to expose the copper surfaces.

Different fluorine containing compositions may be used to strip solder from printed circuit boards and for convenience the following description of the invention will relate principally to the composition most used by industry, to wit, an aqueous solution of ammonium bifluoride and hydrogen peroxide. Peroxide stabilizers are commonly used in the stripper composition to inhibit decomposition of the peroxide and release of oxygen and to prevent severe attack on the copper and board. U.S. Pat. Nos. 3,841,905 and 3,926,699 disclose these type compositions and a method for using the compositions to strip lead-tin solder from a layer of copper on circuit boards. U.S. Pat. No. 4,397,753 discloses a different solder stripping solution containing a hydroxyphenol in an aqueous solution of a nitro-substituted aromatic compound, an inorganic acid such as fluoboric acid and thiourea. The disclosures of the above patents are herein incorporated by reference.

In general, tin-lead binary alloy deposits on the printed circuit boards are removed by immersing the boards in the stripper solution. The contacting may also be effected by spraying. To facilitate the stripping of the solder from those boards having contact tabs, those portions of the printed circuit board which are immediately adjacent and contiguous with the inner-most end portions of the circuit board are blocked or masked off with a resist continuous layer which is resistant to and unaffected by the aqueous stripper solution. This masking layer should be one that is readily removable manually or otherwise, and is exemplified by Scotch tape or an electricians dielectric tape.

During the stripping operation, the solution becomes contaminated with the lead and tin of the solder, copper from the circuit board and resultant complex chemical reaction products. A sludge containing such contaminants also forms. Eventually, the solution is depleted or spent and must be discarded or, preferably, regenerated for reuse. Waste treatment of spent chemical solutions is a serious problem and industry has long been aware that recovery of the exhausted solution would be of substantial economic benefit, especially if the recovered product performs like the original composition.

In general, the ammonium bifluoride-hydrogen peroxide solutions are now replenished during use by addition of hydrogen peroxide to the solution when the concentration falls below set limits. Replenishment of the ammonium bifluoride is ordinarily not necessary. The solutions cannot be replenished in any event, however, when the impurities, such as tin, lead and copper, exceed certain levels and it is necessary at this point to remove these materials from the solution followed by, if needed, replenishment of the active ingredients.

Regeneration of spent solder stripping solutions is very difficult however, because not only must certain impurities be effectively removed from solutions containing a variety of impurities, including unknown complex reaction products, but the solution should not be significantly changed in pH or volume which would require further regeneration procedures. For example, precipitation of tin as a hydroxide may be effected by adding an excess of hydroxyl ions to the solution. Unfortunately, the solution volume increase may be significant and an acid would then have to be added to lower the pH to the desired range. Other separation techniques such as evaporation have also proved ineffective.

Tin is perhaps the most troublesome impurity in terms of removal from the spent solder stripping solution and it is an object of this invention to provide an efficient method for the tin removal.

Another object of the present invention is to provide a method for the regeneration for reuse of spent solder stripping solutions.

SUMMARY OF THE INVENTION

It has been discovered that fluorine containing solder stripping compositions containing contaminant tin from, e.g., the stripping of solder from printed circuit boards, may be regenerated for reuse by adding potassium ions to the solution to form a solid potassium-tin compound which may be separated from the solution. The preferred source of potassium ions is $KHF_2$ since this material adds bifluoride ions to the solution and decreases the amount of bifluoride which must be added to replenish the solution to its original concentration. The method of the invention also provides for removing contaminate lead and copper ions from the solution, with the treated and replenished solution having stripping properties substantially equivalent to the original solution.

One particular stripping solution comprises hydrofluoric acid or salts thereof, ammonia and an oxygen source such as hydrogen peroxide. This solution may be exemplified by an aqueous mixture of ammonium bifluoride and hydrogen peroxide. By fluorine containing solder stripping solution is meant to include those compositions containing fluorine in any form such as bifluoride ions, fluoride ions, fluoborate ions, fluosilicic ions, and the like.

In a preferred embodiment, the spent solution is first filtered to remove sludge and excess peroxide decomposed by conventional techniques such as activated carbon treatment. The solution is then treated with lime to separate lead. Soluble tin is now reduced by the addition of potassium ions to precipitate a potassium-tin compound, which appears to be mainly $K_2SnF_6$. After filtration to remove the tin precipitate, the solution is passed through a chelating ion exchange resin in the H+ form to remove copper ions. The solution is then replenished to the desired concentration with ammonium bifluoride and hydrogen peroxide. Other materials such as peroxide stabilizers may also be added to the solution if desired.

DETAILED DESCRIPTION OF THE INVENTION

A typical stripping solution contains, by weight, about 0.5% to 50% ammonium bifluoride, about 0.5% to 35% hydrogen peroxide, stabilizers, inhibitors and the balance water. During the stripping operation, tin, lead and copper ions and complex chemical reaction products will be introduced into the bath and contaminate the bath. Normally the bath is considered inoperative and nonreplenishable when the tin concentration has exceeded about 50 g/l and/or the ammonium bifluoride concentration falls below about 150 g/l.

These spent solutions must now be treated to regenerate the bath for reuse and, broadly stated, it is desirable to decrease the tin, lead and copper to their lowest possible levels to achieve a regenerated solution which will have the maximum operating life. In general, following the method of the invention, the copper and lead will be reduced to levels below about 1-2 mg/l and the tin to a level below about 20 g/l, preferably below about 10 g/l.

While the amount of soluble contaminants in the stripped solution will vary widely depending on the solder being stripped, the conditions of stripping, the stripping composition and the number of boards stripped, among others, the soluble contaminants in a spent solution are generally at levels shown in Table 1.

TABLE 1

| Contaminant | Range (g/l) |
| --- | --- |
| Tin | 5-50 |
| Lead | 0.02-0.25 |
| Copper | 0.1-5 |

Contaminant levels above the maximum values shown in Table 1 generally result in the solution being ineffective even though the ammonium bifluoride and peroxide concentrations are at their normal operating levels. Tin concentration appears to have the most deleterious effect on the stripping rate of the solution and is the element which is preferably controlled in order to provide a replenished stripping solution. Copper and lead removal, while optional, is highly preferred.

The method of the invention regarding tin removal comprises treating the solution with potassium ions to form a potassium-tin compound which may be separated and removed from the solution by conventional procedures such as filtration. Analysis of the precipitate compound shows the compound to be mainly $K_2SnF_6$. Any source of potassium ions may be used and $KHF_2$ KF and KOH are preferred because of their demonstrated effectiveness. $KHF_2$ is the most preferred source of potassium ions because it provides replenishment bifluoride ions and doesn't significantly affect the pH of the solution.

The potassium source may be added to the solution in any form and is preferably added as a solid to minimize dilution of the solution. The amount of potassium employed may vary widely and depends upon the tin concentration and the desired removal efficiency. In general, it is preferred that the amount used provide, after tin precipitation, a potassium ion concentration less than about 25 g/l since higher levels are somewhat detrimental to the regenerated stripper's performance. Any problems with excessive potassium ions in the regenerated solution are generally minimized during use however, since stripped contaminant tin is dissolved and being precipitated from the solution thus lowering both the potassium and tin concentrations. In a preferred embodiment, a potassium ion concentration is maintained in the stripping solution during use to continually precipitate the tin being stripped. Either stepwise or continuous potassium addition may be employed. In a further embodiment, it is preferred that the new, original stripper solution also contain potassium ions to enhance the useful life of the solution.

Removal of the contaminant metal ions may be performed in any sequence and it is preferred that the peroxide level be reduced to below about 15 g/l before any of the removal steps. Conventional methods such as activated carbon treatment can be used to lower the peroxide concentration.

Sludge, generally lead fluoride, is separated by filtration and the soluble lead is removed by treating the solution with a material such as lime to form an insoluble lead precipitate. Filtration of the solution removes the lead and lead contaminated $CaF_2$ precipitate. Any suitable quantity of the precipitant may be employed. Copper may be removed by passing the solution through a chelating ion exchange resin such as Amberlite IRC-718 in a cation form, e.g.; H+, electrolysis or other suitable method.

The temperature of the solution during treatment, especially during the lead and tin precipitation steps, may vary widely and is preferably at room temperature and below. In general, the lower the temperature of the solution, the greater the separation and lower the remaining contaminant (i.e. potassium and tin) concentrations. The addition of solid $KHF_2$ to the spent solution is very beneficial since it results in a lowering of the temperature of the solution (endothermic reaction) and performing the reaction starting with the solution at room temperature has produced satisfactory separation results. Mixing of the solution during treatment is necessary to achieve a satisfactory separation rate and efficiency.

After removal of the contaminant ions, the solution may be replenished by adding ammonium bifluoride and hydrogen peroxide and any other additives to the desired levels. Ammonium hydroxide may be employed in part in place of ammonium bifluoride if excess bifluoride ions are present in the treated solution.

The following example further illustrates the invention.

EXAMPLE 646 liters of an ammonium bifluoride-hydrogen peroxide filtered spent solder stripper solution was analyzed and found to contain 43 g/l tin, 33 mg/l lead and 6 g/l copper. The original solution is ENSTRIP TL 143 sold by Enthone, Incorporated, West Haven, Conn. The peroxide level was less than about 15 g/l.

2.5. kilograms (kg.) of lime were added to the room temperature solution and the mixture stirred for about 1 hour. The mixture was filtered and the lead ion concentration was reduced to about 1 mg/l. 29.5 kg. of potassium bifluoride were then added to the solution. Dissolution was endothermic and the temperature dropped to about 13° C. with concurrent crystallization of a tin precipitate (analyzed as $K_2SnF_6$). The tin concentration was reduced to 16 g/l (about 60% removal). 480 liters of the treated solution were passed through an Amberlite IRC-718 resin column in the $H^+$ form for copper removal. Column effluent measured: copper 0.2 mg/l; $NH_4HF_2$ 134 g/l; and $K^+$ 7 g/l.

430 liters of the resin-treated liquid were replenished by adding 107 kg. $NH_4HF_2$ and 96 liters 50% $H_2O_2$. Final volume was 622 liters and analysis showed 10.6 g/l tin; 0.6 mg/l copper; 0.4 mg/l lead; 280 g/l $NH_4HF_2$; and 104 g/l $H_2O_2$. The volume of the final regenerated product in relation to the volume of the spent product was about 1.2:1.

The regenerated and replenished product was tested in a printed circuit board manufacturing plant to strip solder from copper circuit epoxy boards and the solution performed as well as a new (nonrecycled) product.

It will be apparent that many changes and modifications of the several features described herein may be made without departing from the spirit and scope of the invention. It is therefore apparent that the foregoing description is by way of illustration of the invention rather than limitation of the invention.

We claim:

1. A method of regenerating for reuse an aqueous stripping solution comprising hydrofluoric acid or salts thereof, ammonia and an oxygen source which solution has been used to strip solder from a substrate comprising:
   (a) adding potassium ions to the solution to precipitate a tin containing compound from the solution;
   (b) removing the precipitated tin from the resulting solution; and
   (c) adding components of the stripping solution, as necessary, to regenerate the solution.

2. A method for stripping solder from substrates with a solution comprising hydrofluoric acid or salts thereof, ammonia and an oxygen source comprising contacting the substrate with the solution and maintaining an effective amount of potassium ions in the solution to precipitate the dissolving tin.

3. The method of claim 1 wherein the solution contains ammonium bifluoride and hydrogen peroxide.

4. The method of claim 3 wherein the source of the potassium ions is at least one of $KHF_2$, KF and KOH.

5. The method of claim 4 wherein the source of potassium ions is added to the solution as a solid.

6. The method of claim 5 wherein the temperature of the solution before treatment is at room temperature or below.

7. The method of claim 6 wherein the source of postassium ions is $KHF_2$.

* * * * *